J. H. RHOMBERG.
HOE.
APPLICATION FILED NOV. 7, 1917.

1,286,779.  Patented Dec. 3, 1918.

Inventor
Joseph H. Rhomberg
By M. M. Cady
Attorney

UNITED STATES PATENT OFFICE.

JOSEPH H. RHOMBERG, OF DUBUQUE, IOWA.

HOE.

1,286,779.   Specification of Letters Patent.   Patented Dec. 3, 1918.

Application filed November 7, 1917. Serial No. 200,700.

*To all whom it may concern:*

Be it known that I, JOSEPH H. RHOMBERG, a citizen of the United States, residing at Dubuque, in the county of Dubuque and State of Iowa, have invented certain new and useful Improvements in Hoes, of which the following is a specification.

My invention belongs in the class of agricultural implements, with more special reference to hoes for the cultivation of gardens, and the thought is to provide a hoe that will readily cut up and destroy the weeds and at the same time thoroughly pulverize the soil. With this thought in view, it consists in a blade attached to a handle and provided with cutting members of angular shape projecting out from one or both sides of the blade at substantially right angles to the plane of the blade.

The specification that follows, with the drawings accompanying the same and forming a part thereof, will clearly describe and illustrate both the mode of construction and the manner of using, whereby I accomplish the ends sought.

Like characters of reference denote corresponding parts in each of the figures.

Figure 1:
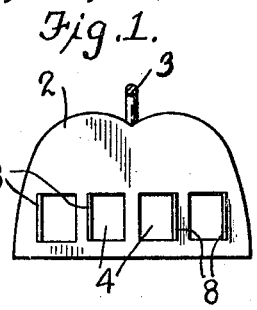
Figure 1 is a plan view of the front of the blade.
Figure 2:
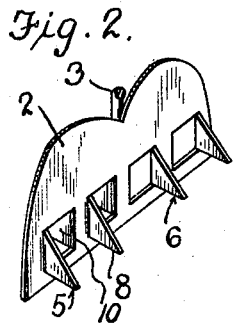
Fig. 2 is a perspective view taken from the front of the blade.
Figure 3:
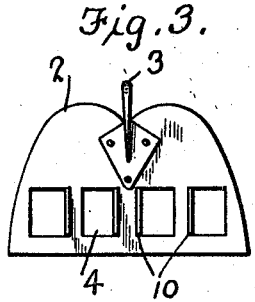
Fig. 3 is a plan view of the rear of the blade.
Figure 4:
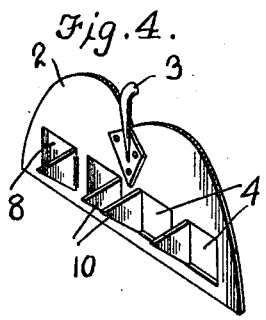
Fig. 4 is a perspective view of the blade taken from the rear.
Figures 5, 6:
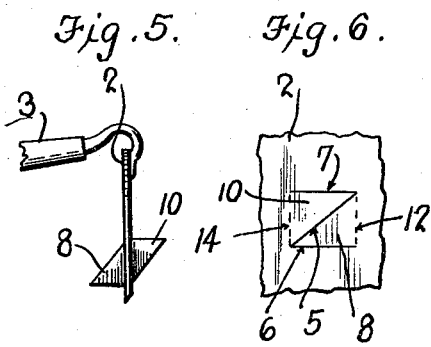
Fig. 5 is an end view.
Fig. 6 is a plan view of a portion of the blade showing how the cutter members may be formed when they are integral with the blade.
Figure 7:
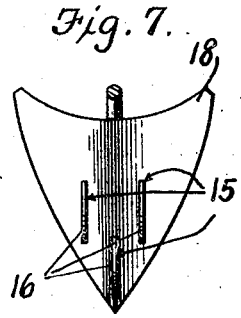
Fig. 7 is a plan view of a different shaped blade for a different use showing the manner of attaching the cutter members where they are not made integral with the blade, taken from the front side.
Figure 8:
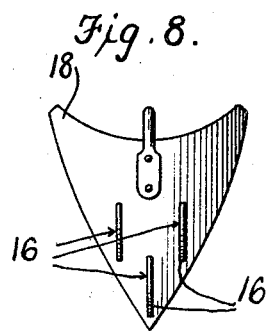
Fig. 8 is a plan view taken from the rear.

Having reference to the drawings, 2 designates one form of blade attached to the handle 3. Where the cutter members are formed integral with the blade lines 5, 6 and 7 as shown in Fig. 6, are cut in the blade, and the parts 8 are bent out at substantially right angles to the plane of the blade, which form the cutting members on the front of the blade and the other parts 10 are bent back and form the rear cutting members, leaving the openings 4 in the blade. When finished the cutting members will appear as shown in Fig. 5 and will be in the form of a right angle triangle with the base of the triangle pointing up toward the top of the blade on the rear, and the base of the triangle pointing downward in the front of the blade. All of the cutting members 8 and 10 are preferably in the same parallel planes and substantially at right angles to the plane of the blade.

Figure 9:
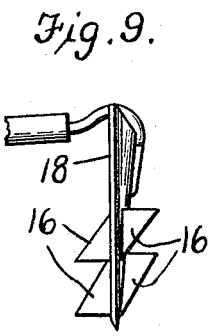
Fig. 9 is an end view.
Figure 10:
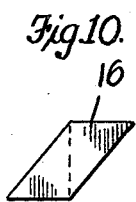
Fig. 10 is a view of another form of cutter member.

In Figs. 7, 8, 9, and 10 is shown a blade for use more especially in cutting the weeds and cultivating the soil between the rows of vegetables such as beets, carrots and the like where the rows are not far apart. In a hoe for such use the blade of the hoe is preferably pointed at its cutting edge and there are not necessarily any openings 4 in the blade but a convenient mode of forming and setting the cutters 16 is by cutting slots 15 in the blade and then securing in these slots triangular plates, or cutters 16', shown in Fig. 10, which are preferably formed by a single piece and secured in the slots 15 and project in about equal parts in front and rear of the blade, as shown in Fig. 9.

In use the weeds will be cut and at the same time the soil thoroughly pulverized both by the cutting edge of the blade and by the cutters both in the front and rear of the blade.

It will be seen that the manner of setting and securing the cutters in the blades may be subject of numerous changes according to the convenience and ideas of different manufacturers and also the shape of the cutters, without departing materially from the spirit of my invention.

Having now described my invention, what I claim is:—

1. A hoe comprising a handle; and a substantially flat blade, said blade having horizontal sets of forwardly and rearwardly extending vertical triangular cutters, the forwardly extending set of triangular cutters having their upper edges horizontal and their lower edges oblique, and the rearwardly extending set of triangular cutters having their upper edges oblique and lower edges horizontal.

2. A hoe comprising a handle; and a substantially flat blade, said blade having oblique slits and horizontal slits which extend in opposite directions and join the opposite ends of the oblique slits whereby triangular cutters are formed, said cutters being bent forwardly and rearwardly, the forward cutters having upper horizontal edges and lower oblique edges, and the rear cutters having upper oblique edges and lower horizontal edges.

In testimony whereof I affix my signature in the presence of two witnesses.

JOSEPH H. RHOMBERG.

Witnesses:
 M. M. CADY,
 E. H. WILLGING.

Copies of this patent may be obtained for five cents each, by addressing the "Commissioner of Patents, Washington, D. C."